US012632727B2

(12) United States Patent
Metz et al.

(10) Patent No.: US 12,632,727 B2
(45) Date of Patent: May 19, 2026

(54) TRAINING NEURAL NETWORKS USING LEARNED OPTIMIZERS

(71) Applicant: Google LLC, Mountain View, CA (US)

(72) Inventors: Luke Shekerjian Metz, Mountain View, CA (US); Christian Daniel Freeman, San Francisco, CA (US); Jascha Narain Sohl-Dickstein, San Francisco, CA (US); Niruban Maheswaranathan, San Jose, CA (US); James Michael Harrison, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1022 days.

(21) Appl. No.: 17/831,338

(22) Filed: Jun. 2, 2022

(65) Prior Publication Data

US 2022/0391706 A1 Dec. 8, 2022

Related U.S. Application Data

(60) Provisional application No. 63/196,180, filed on Jun. 2, 2021.

(51) Int. Cl.
*G06N 3/08* (2023.01)
*G06N 3/0985* (2023.01)

(52) U.S. Cl.
CPC ............. *G06N 3/08* (2013.01); *G06N 3/0985* (2023.01)

(58) Field of Classification Search
CPC ................................ G06N 3/08; G06N 3/0985

(Continued)

(56) References Cited

U.S. PATENT DOCUMENTS

| 12,430,543 B2 * | 9/2025 | Baum | ..................... G06N 3/084 |
| 2012/0303565 A1 * | 11/2012 | Deng | ................... G06N 3/0499 |
| | | | 706/25 |

(Continued)

FOREIGN PATENT DOCUMENTS

| CN | 113159287 A | * | 7/2021 | ............. G06N 3/045 |
| CN | 110082738 B | * | 3/2023 | ............. G01S 7/417 |

OTHER PUBLICATIONS

Christian Daniel et al., "Learning Step Size Controllers for Robust Neural Network Training", 2016, AAAI, https://doi.org/10.1609/aaai.v30i1.10187 (Year: 2016).*

(Continued)

*Primary Examiner* — Usmaan Saeed
(74) *Attorney, Agent, or Firm* — Fish & Richardson P.C.

(57) ABSTRACT

Methods, systems, and apparatus, including computer programs encoded on computer storage media, for training neural networks using learned optimizers. One of method is for training a neural network layer comprising a plurality of network parameters having a plurality of dimensions each having a plurality of indices, the method comprising: maintaining a set of values corresponding to respective sets of indices of each dimension, each value representing a measure of central tendency of past gradients of the network parameters having an index in the dimension that is in the set of indices; performing a training step to obtain a new gradient for each network parameter; updating each set of values using the new gradients; and for each network parameter: generating an input from the updated sets of values; processing the input using an optimizer neural network to generate an output defining an update for the network parameter; and applying the update.

20 Claims, 4 Drawing Sheets

(58) Field of Classification Search

USPC .......................................................... 706/28

See application file for complete search history.

(56) References Cited

U.S. PATENT DOCUMENTS

| | | | | |
|---|---|---|---|---|
| 2019/0034798 A1* | 1/2019 | Yu | .......................... | G06N 3/045 |
| 2019/0171935 A1* | 6/2019 | Agrawal | ................ | G06N 3/084 |
| 2020/0151570 A1* | 5/2020 | Ravi | ........................ | G06N 3/048 |
| 2020/0184337 A1* | 6/2020 | Baker | ................... | G06F 18/285 |
| 2022/0021104 A1* | 1/2022 | Kaufmann | ............. | H01Q 5/364 |

OTHER PUBLICATIONS

Brenden M. Lake et al., "Building Machines That Learn and Think Like People", Nov. 2, 2016, arXiv:1604.00289v3 (Year: 2016).*
Ahmed Gad, "Deduce the Number of Layers and Neurons for ANN", Sep. 11, 2018, DataCamp, https://www.datacamp.com/tutorial/layers-neurons-artificial-neural-networks (Year: 2018).*
Abadi et al., "Tensorflow: A system for large-scale machine learning," 12th USENIX Symposium on Operating Systems Design and Implementation (OSDI '16), Nov. 2-4, 2016, pp. 265-283.
Akiba et al., "Optuna: A Next-Generation Hyperparameter Optimization Framework," CoRR, Submitted on Jul. 25, 2019, arXiv:1907. 10902, 10 pages.
Andrychowicz et al., "Learning to learn by gradient descent by gradient descent," 30th Conference on Neural Information Processing Systems, 2016, 9 pages.
Anil et al., "Memory-Efficient Adaptive Optimization," CoRR, Submitted on Sep. 11, 2019, arXiv:1901.11150, 16 pages.
Anil et al., "Second Order Optimization Made Practical," CoRR, Submitted on Feb. 20, 2020, arXiv:2002.09018, 18 pages.
Bello et al., "Neural Optimizer Search with Reinforcement Learning," Proceedings of the 34th International Conference on Machine Learning, 2017, 10 pages.
Bengio et al., "On the Optimization of a Synaptic Learning Rule," Preprints Conf. Optimality in Artificial and Biological Neural Networks, 1992, 29 pages.
Bergstra et al., "Algorithms for Hyper-Parameter Optimization," Advances in neural information processing systems, 2011, 9 pages.
Bergstra et al., "Random Search for Hyper-Parameter Optimization," Journal of Machine Learning Research, Feb. 2012, 13(10):281-305.
Bottou, "Large-Scale Machine Learning With Stochastic Gradient Descent," Proceedings of COMPSTAT'2010, 2010, pp. 177-186.
Cao et al., "Learning to Optimize in Swarms," CoRR, Submitted on Nov. 16, 2019, arXiv:1911.03787, 16 pages.
Chelba et al., "One Billion Word Benchmark for Measuring Progress in Statistical Language Modeling," CoRR, Submitted on Dec. 11, 2013, arXiv:1312.3005, 6 pages.
Chen et al., "Learning to Learn without Gradient Descent by Gradient Descent," CoRR, Submitted on Jun. 5, 2017, arXiv:1611. 03824, 9 pages.
Chen et al., "Training Stronger Baselines for Learning to Optimize," 34th Conference on Neural Information Processing Systems, 2020, 12 pages.
Cs.toronto.edu [online], "Cifar-10 and cifar-100 datasets," available on or before Sep. 23, 2009, via Internet Archive: Wayback Machine URL <http://web.archive.org/web/20090915000000/https://www.cs.toronto.edu/~kriz/cifar.html>, retrieved on Dec. 4, 2023, URL <https://www.cs.toronto.edu/~kriz/cifar.html>, 4 pages.
Daniel et al., "Learning Step Size Controllers for Robust Neural Network Training," Proceedings of the 30th AAAI Conference on Artificial Intelligence, 2016, 30(1):1519-1525.
Dennis et al., "Quasi-Newton Methods, Motivation and Theory," SIAM review, 1977, 19(1):46-89.
Developers.googleblog.com [online], "XLA—TensorFlow, compiled," Mar. 6, 2017, retrieved on Dec. 4, 2023, retrieved from URL<https://developers.googleblog.com/2017/03/xla-tensorflow-compiled.html>, 5 pages.

Dozat, "Incorporating Nesterov Momentum Into Adam," Workshop track—ICLR, 2016, 4 pages.
Duchi et al., "Adaptive Subgradient Methods for Online Learning and Stochastic Optimization," Journal of Machine Learning Research, Jul. 2011, 12(1):2121-2159.
Frostig et al., "Compiling machine learning programs via high-level tracing," Systems for Machine Learning, Feb. 2018, 3 pages.
Github.com [online], "Haiku: Sonnet for JAX," 2020, Retrieved on Dec. 4, 2023, retrieved from URL<http://github.com/deepmind/dm-haiku>, 8 pages.
Github.com [online], "JAX: composable transformations of Python+ NumPy programs," 2018, Retrieved on Dec. 6, 2023, retrieved from URL <http://github.com/google/jax>, 11 pages.
Golovin et al., "Google Vizier: A Service for Black-Box Optimization," Proceedings of the 23rd ACM SIGKDD international conference on knowledge discovery and data mining, Aug. 13-17, 2017, pp. 1487-1496.
Gong et al., "Meta-Learning for Stochastic Gradient MCMC," CoRR, Submitted on Jun. 12, 2018, arXiv:1806.04522, 17 pages.
Gupta et al., "Shampoo: Preconditioned Stochastic Tensor Optimization," Proceedings of the 35th International Conference on Machine Learning, 2018, 9 pages.
Hansen, "Using Deep Q-Learning to Control Optimization Hyperparameters," CoRR, Submitted on Jun. 19, 2016, arXiv:1602. 04062, 14 pages.
He et al., "Deep Residual Learning for Image Recognition," Proceedings of the IEEE conference on computer vision and pattern recognition, 2016, pp. 770-778.
Hinton et al., "Lecture 6: Overview of mini-batch gradient descent," Neural Networks for Machine Learning, 2012, 31 pages.
Hochreiter et al., "Long short-term memory," Neural computation, Dec. 1997, 9(8):1735-1780.
Jouppi et al., "In-Datacenter Performance Analysis of a Tensor Processing Unit," Proceedings of the 44th annual international symposium on computer architecture, Jun. 24-28, 2017, 12 pages.
Kingma et al., "Adam: A Method for Stochastic Optimization," CoRR, Submitted on Dec. 22, 2014, arXiv:1412.6980, 9 pages.
Le et al., "On optimization methods for deep learning," Proceedings of the 28th International Conference on Machine Learning, 2011, 8 pages.
Levy et al., "Generalizing Hamiltonian Monte Carlo with Neural Networks," CoRR, Submitted on Mar. 2, 2018, arXiv:1711.09268, 15 pages.
Li et al., "Learning to Optimize Neural Nets," CoRR, Submitted on Nov. 30, 2017, arXiv:1703.00441, 10 pages.
Li et al., "Learning to Optimize," International Conference on Learning Representations, 2017, 13 pages.
Liu et al., "On the limited memory bfgs method for large scale optimization," Mathematical Programming, Aug. 1989, 45(1):503-528.
Liu et al., "On the variance of the adaptive learning rate and beyond," CoRR, Submitted on Aug. 8, 2019, arXiv:1908.03265, 14 pages.
Loshchilov et al., "Decoupled Weight Decay Regularization," CoRR, Submitted on Jan. 4, 2019, arXiv:1711.05101, 19 pages.
Lucas et al., "Aggregated Momentum: Stability Through Passive Damping," CoRR, Submitted on Apr. 1, 2018, arXiv:1804.00325, 18 pages.
Lv et al., "Learning Gradient Descent: Better Generalization and Longer Horizons," CoRR, Submitted on Jun. 10, 2017, arXiv:1703. 03633, 9 pages.
Maclaurin et al., "Gradient-based Hyperparameter Optimization through Reversible Learning," Proceedings of the 32nd International Conference on Machine Learning, 2015, 10 pages.
Maheswaranathan et al., "Guided evolutionary strategies: Augmenting random search with surrogate gradients," Proceedings of the 36th International Conference on Machine Learning, 2019, 10 pages.
Maheswaranathan et al., "Reverse engineering learned optimizers reveals known and novel mechanisms," CoRR, Submitted on Nov. 4, 2020, arXiv:2011.02159, 18 pages.

(56) References Cited

OTHER PUBLICATIONS

Martens et al., "Optimizing Neural Networks with Kronecker-factored Approximate Curvature," Proceedings of the 32nd International conference on machine learning, 2015, 10 pages.

Merchant et al., "Learn2hop: Learned Optimization on Rough Landscapes With Applications to Atomic Structural Optimization," Proceedings of the 38th International Conference on Machine Learning, 2021, 11 pages.

Metz et al., "Learning Unsupervised Learning Rules," CoRR, Submitted on May 23, 2018, arXiv:1804.00222, 25 pages.

Metz et al., "Tasks, stability, architecture, and compute: Training more effective learned optimizers, and using them to train themselves," CoRR, Submitted on Sep. 23, 2020, arXiv:2009.11243, 36 pages.

Metz et al., "Training Learned Optimizers with Randomly Initialized Learned Optimizers," CoRR, Submitted on Jan. 14, 2021, arXiv:2101.07367, 3 pages.

Metz et al., "Understanding and correcting pathologies in the training of learned optimizers," Proceedings of the 36th International Conference on Machine Learning, 2019, 10 pages.

Metz et al., "Using a thousand optimization tasks to learn hyperparameter search strategies," CoRR, Submitted on Apr. 1, 2020, arXiv:2002.11887, 34 pages.

Metz et al., "Using learned optimizers to make models robust to input noise," CoRR, Submitted on Jun. 8, 2019, arXiv:1906.03367, 8 pages.

Norrie et al., "Google's Training Chips Revealed: TPUv2 and TPUv3," 2020 IEEE Hot Chips 32 Symposium (HCS), Aug. 16-18, 2020, 70 pages.

Polyak, "Some methods of speeding up the convergence of iteration methods," Ussr computational mathematics and mathematical physics, Nov. 26, 1962, 4(5):1-17.

Ravi et al., "Optimization As a Model for Few-Shot Learning," International Conference on Learning Representations, 2017, 11 pages.

Reddi et al., "Adaptive Methods for Nonconvex Optimization," Proceedings of 32nd Conference on Neural Information Processing Systems, 2018, 11 pages.

Robbins et al., "A Stochastic Approximation Method," The annals of mathematical statistics, Sep. 1951, pp. 400-407.

Ruder, "An overview of gradient descent optimization algorithms," CoRR, Submitted on Sep. 15, 2016, arXiv:1609.04747, 12 pages.

Runarsson et al., "Evolution and design of distributed learning rules," 2000 IEEE Symposium on Combinations of Evolutionary Computation and Neural Networks, May 11-13, 2000, pp. 59-63.

Russakovsky et al., "ImageNet Large Scale Visual Recognition Challenge," International Journal of Computer Vision, Apr. 11, 2015, 115(3):211-252.

Schmidt et al., "Descending through a crowded valley-benchmarking deep learning optimizers," CoRR, Submitted on Oct. 5, 2020, arXiv:2007.01547, 30 pages.

Shazeer et al., "Adafactor: Adaptive Learning Rates with Sublinear Memory Cost," CoRR, Submitted on Apr. 11, 2018, arXiv:1804.04235, 9 pages.

Shen et al., "Learning A Minimax Optimizer: A Pilot Study," International Conference on Learning Representations 2021, 2021, 16 pages.

Simonyan et al., "Very Deep Convolutional Networks for Large-Scale Image Recognition," CoRR, Submitted on Dec. 23, 2014, arXiv:1409.1556, 13 pages.

Snoek et al., "Practical Bayesian Optimization of Machine Learning Algorithms," Advances in neural information processing systems, 2012, 9 pages.

Strubell et al., "Energy and Policy Considerations for Deep Learning in NLP," Proceedings of the 57th Annual Meeting of the Association for Computational Linguistics, Jul. 28-Aug. 2, 2019, pp. 3645-3650.

Tan et al., "EfficientNet: Rethinking Model Scaling for Convolutional Neural Networks," Proceedings of the 36th International Conference on Machine Learning, 2019, 10 pages.

Vaswani et al., "Attention Is All You Need," 31st Conference on Neural Information Processing Systems, 2017, 11 pages.

Vicol et al., "Unbiased Gradient Estimation in Unrolled Computation Graphs with Persisted Evolutionary Strategies," CoRR, Submitted on Dec. 27, 2021, arXiv:2112.13835, 39 pages.

Wang et al., "Meta-Learning MCMC Proposals," 32nd Conference on Neural Information Processing System, 2018, 11 pages.

Wichrowska et al., "Learned Optimizers that Scale and Generalize," Proceedings of the 34th International Conference on Machine Learning, 2017, 10 pages.

Xiao et al., "Fashion-MNIST: a Novel Image Dataset for Benchmarking Machine Learning Algorithms," CoRR, Submitted on Sep. 15, 2017, arXiv:1708.07747, 6 pages.

Xiong et al., "Improved Adversarial Training via Learned Optimizer," Springer, Nov. 7, 2020, pp. 85-100.

Xu et al., "Learning an Adaptive Learning Rate Schedule," CoRR, Submitted on Sep. 20, 2019, arXiv:1909.09712, 6 pages.

Xu et al., "Reinforcement Learning for Learning Rate Control," CoRR, Submitted on May 31, 2017, arXiv:1705.11159, 7 pages.

You et al., "Large Batch Optimization for Deep Learning: Training Bert in 76 minutes," CoRR, Submitted on Sep. 25, 2019, arXiv:1904.00962, 37 pages.

Zeiler, "Adadelta: an adaptive learning rate method," CoRR, Submitted on Dec. 22, 2012, arXiv:1212.5701, 6 pages.

* cited by examiner

100

200

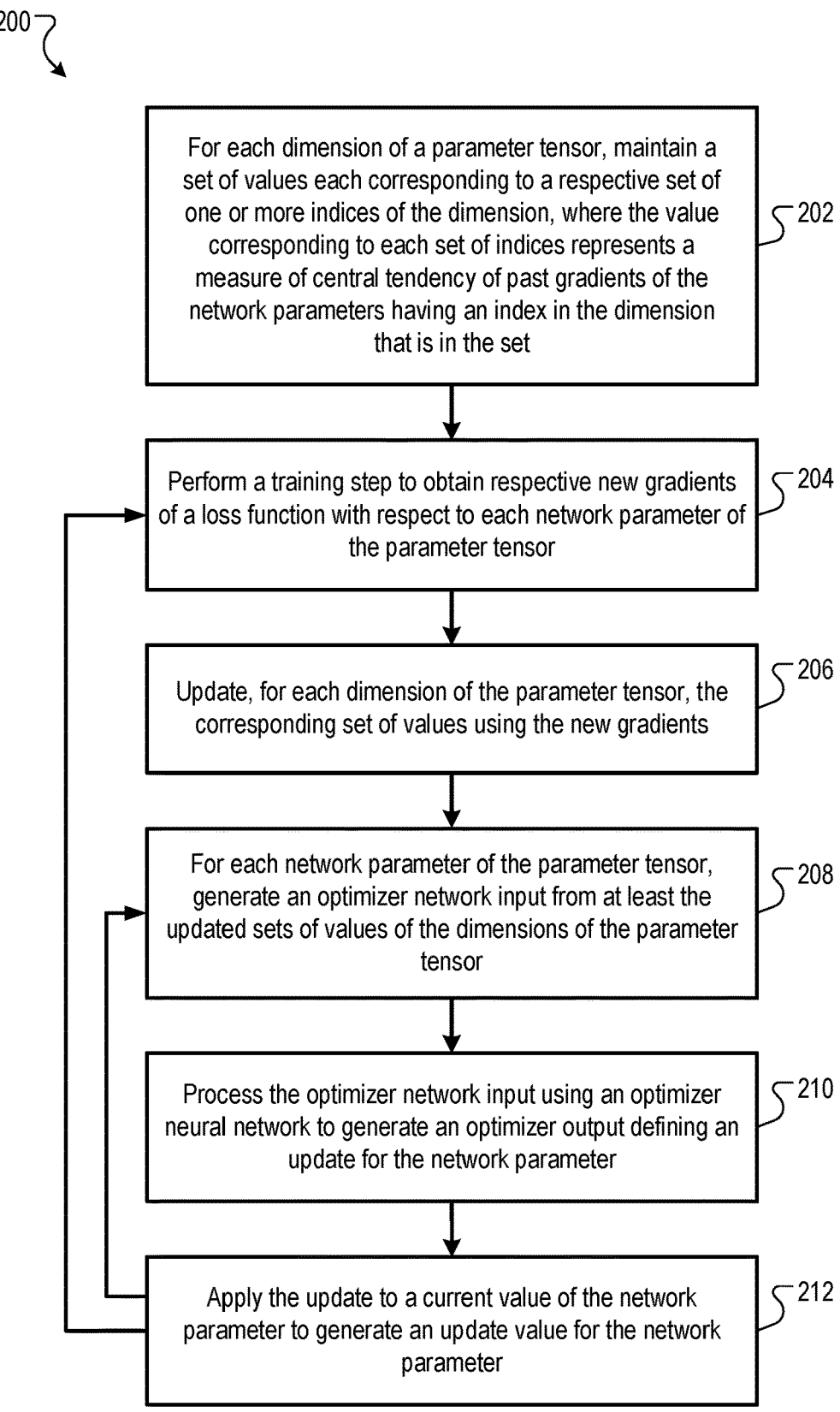

For each dimension of a parameter tensor, maintain a set of values each corresponding to a respective set of one or more indices of the dimension, where the value corresponding to each set of indices represents a measure of central tendency of past gradients of the network parameters having an index in the dimension that is in the set

202

Perform a training step to obtain respective new gradients of a loss function with respect to each network parameter of the parameter tensor

204

Update, for each dimension of the parameter tensor, the corresponding set of values using the new gradients

206

For each network parameter of the parameter tensor, generate an optimizer network input from at least the updated sets of values of the dimensions of the parameter tensor

208

Process the optimizer network input using an optimizer neural network to generate an optimizer output defining an update for the network parameter

210

Apply the update to a current value of the network parameter to generate an update value for the network parameter

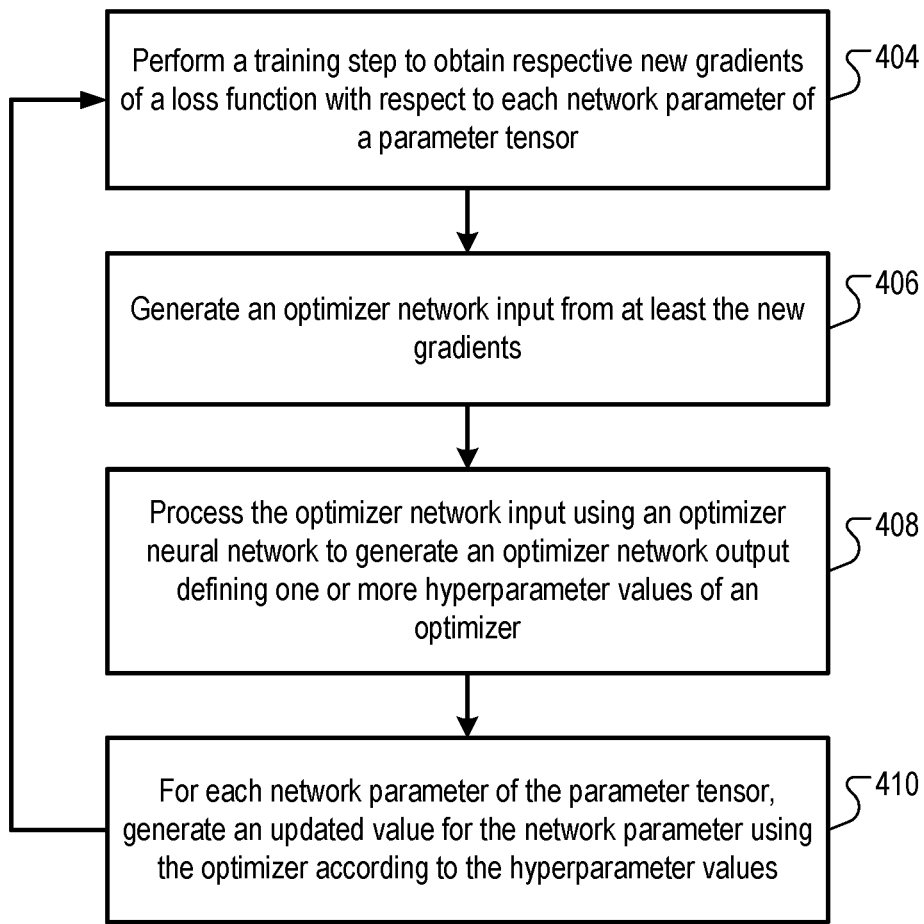

Perform a training step to obtain respective new gradients of a loss function with respect to each network parameter of a parameter tensor ⌐404

Generate an optimizer network input from at least the new gradients ⌐406

Process the optimizer network input using an optimizer neural network to generate an optimizer network output defining one or more hyperparameter values of an optimizer ⌐408

For each network parameter of the parameter tensor, generate an updated value for the network parameter using the optimizer according to the hyperparameter values ⌐410

FIG. 4

TRAINING NEURAL NETWORKS USING LEARNED OPTIMIZERS

CROSS-REFERENCE TO RELATED APPLICATION

This application claims priority to U.S. Provisional Application No. 63/196,180, filed on Jun. 2, 2021. The disclosure of the prior application is considered part of and is incorporated by reference in the disclosure of this application.

BACKGROUND

This specification relates to training neural networks. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a first neural network (called a "trainee" neural network herein) that is configured to perform a particular machine learning task using a second neural network (called an "optimizer" neural network herein) that is configured to generate network outputs that specify updates to the parameters of the trainee neural network.

In some implementations, the optimizer neural network is a per-parameter optimizer neural network that is configured to process, for each network parameter in a parameter tensor of the trainee neural network, a respective optimizer network input to generate an optimizer network output defining a parameter update for the network parameter. For example, the optimizer network input for each network parameter can be generated from data that represents, for each index of each dimension of the parameter tensor, a measure of central tendency of the gradients of the network parameters having the index in the dimension across the training stages of the trainee neural network.

In some other implementations, the optimizer neural network is a hyperparameter optimizer neural network that is configured to process, for a parameter tensor of the trainee neural network, an optimizer network input to generate an optimizer network output defining hyperparameters for an optimizer that is configured to generate parameter updates for the parameter tensor. For example, the hyperparameter optimizer neural network can be a recurrent neural network that is configured to maintain an internal state across the training stages of the trainee neural network. The optimizer can be, e.g., an Adam optimizer.

The subject matter described in this specification can be implemented in particular embodiments so as to realize one or more of the following advantages.

Generally, using techniques described in this specification, a system can execute an optimizer neural network that determines updates to parameter values of a trainee neural network during the training of the trainee neural network. By using the described optimizer neural network to determine the updates, e.g., instead of a hand-designed optimization rule, the training of the trainee neural network can be improved, resulting in the trainee network being trained to have improved performance on the machine learning task, the training consuming fewer computational resources, or both.

In some implementations described herein in which the input to the optimizer neural network is generated from terms representing low-rank approximations of historical gradients of the network parameters of the trainee neural network, the optimizer neural network can be highly efficient to execute, not significantly increasing the time, computations, or memory required to train the trainee neural network compared to hand-designed optimizers. For example, Adafactor terms encode a lot of information about the progression of training of the trainee neural network, and thus the optimizer neural network can efficiently leverage this information to generate updates to the trainee neural network to quickly improve the performance of the trainee neural network.

In some implementations described herein in which the optimizer neural network generates outputs that define hyperparameters of an Adam optimizer or a variant of the Adam optimizer, the time required to train the trainee neural network can be significantly reduced compared to some existing systems that use Adam optimizers, because the optimizer neural network provides the flexibility to update the hyperparameters of the Adam optimizer for the specific trainee network architecture, machine learning task, and so on.

In some implementations described herein in which the optimizer neural network is a recurrent neural network that generates outputs that define hyperparameters of an optimizer, the time required to train the trainee neural network can be significantly reduced compared to some existing systems that use the same optimizer, because the optimizer neural network can encode information from the previous training stages of the trainee neural network into the internal state of the recurrent neural network, allowing the optimizer neural network to generate outputs that define higher-quality values for the hyperparameters based on the historical information.

As described herein, because of the manner in which an optimizer neural network is trained, the input features that are provided to the optimizer neural network, and/or the architecture of the optimizer neural network, the parameter updates generated from the output of the optimizer neural network can be more effective than conventional updating approaches (including other learned optimizers). In some implementations, the optimizer neural network can further generalize better to new neural network architectures and new machine learning tasks of the trainee neural network.

In some implementations described herein, the optimizer neural network can be implemented on parallel processing hardware, e.g., special-purpose hardware such as tensor processing units (TPUs), for efficient execution at training and/or inference time, as described in more detail below.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for training a trainee neural network using a per-parameter optimizer neural network.

FIG. 4 is a flow diagram of an example process for training a trainee neural network using a hyperparameter optimizer neural network.

Like reference numbers and designations in the various drawings indicate like elements.

DETAILED DESCRIPTION

This specification describes a system implemented as computer programs on one or more computers in one or more locations that is configured to train a neural network using a machine-learned optimizer.

Figure 1:
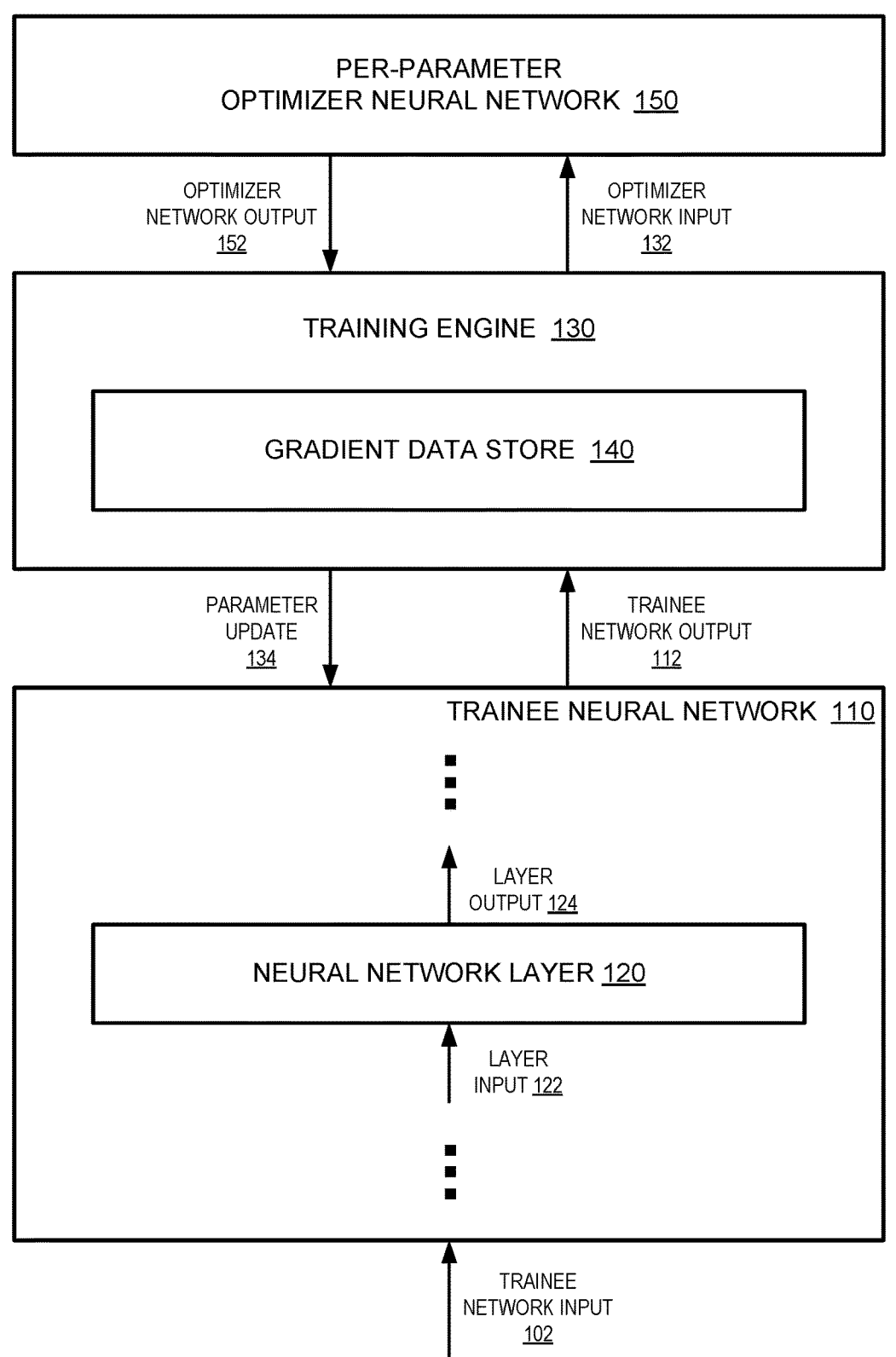
FIG. 1 is a diagram of an example training system that includes a per-parameter optimizer neural network.

FIG. 1 is a diagram of an example training system 100 that includes a per-parameter optimizer neural network 150. The training system 100 is an example of a system implemented as computer programs on one or more computers in one or more locations, in which the systems, components, and techniques described below can be implemented.

The training system 100 is configured to train a trainee neural network 110 to perform a machine learning task. The trainee neural network 110 can be configured to process a trainee network input 102 and to generate a trainee network output 112 that represents a prediction about the trainee network input 102 for the machine learning task. Example machine learning tasks for which training system 100 can train the trainee neural network 110 are discussed below.

In particular, the training system 100 can use the per-parameter optimizer neural network 150 (also called simply an optimizer neural network 150) to train a particular neural network layer 120 of the trainee neural network 110. The neural network layer 120 can be configured to process a layer input 122 using at least a parameter tensor to generate a layer output 124. The parameter tensor can include multiple network parameters, and can have multiple dimensions each with multiple indices.

For example, the parameter tensor can be an N×M matrix, i.e., can include two dimensions where a first dimension has M indices and a second dimension has N indices. As a particular example, the neural network layer 120 can be a feedforward neural network layer that is configured to perform a matrix multiplication between the layer input 122 and the parameter tensor to generate an initial layer output, and then apply a nonlinear activation function (e.g., a sigmoid activation, a ReLU activation, or a softmax activation) to the initial layer output to generate the layer output 124.

As another example, the parameter tensor can be an N×M×C matrix, i.e., can include three dimensions where a first dimension has M indices, a second dimension has N indices, and a third dimension has C indices. As a particular example, the neural network layer 120 can be a convolutional neural network layer that is configured to convolve the parameter tensor on the layer input 122 to generate the layer output 124, i.e., apply a convolutional filter represented by the parameter tensor to the layer input 122 to generate the layer output 124.

For each network parameter of the parameter tensor and at each of multiple training stages as described in more detail below, the per-parameter optimizer neural network 150 can process an optimizer network input 132 corresponding to the network parameter and generate an optimizer network output 152 that represents an update to the value of the network parameter. That is, the optimizer neural network 150 is called a "per-parameter" optimizer neural network because the optimizer neural network 150 is configured to generate optimizer network outputs 152 that represent parameter updates 134 for respective individual network parameters of the parameter tensor. Referring to the optimizer neural network 150 as a per-parameter optimizer neural network should not be interpreted as limiting the nature of the operations that can be performed by the optimizer neural network or otherwise implicitly characterizing the optimizer neural network.

In some implementations, the neural network layer 120 can include multiple different parameter tensors, where at least one of the parameter tensors are trained using the per-parameter optimizer neural network 150 as described below. For example, the neural network layer 120 can be a self-attention neural network layer that is configured to apply a self-attention mechanism to the layer input 122 to generate the layer output 124, where the self-attention mechanism is parameterized by a query parameter tensor, a key parameter tensor, and a value parameter tensor.

The trainee neural network 110 can include multiple neural network layers. In some implementations, the training system 100 trains multiple different neural network layers of the trainee neural network 110 using the per-parameter optimizer neural network 150 as described below. For example, each neural network layer of the trainee neural network 110 can be trained using the same per-parameter optimizer neural network 150. In some other implementations, the training system 100 trains each of multiple different neural network layers of the trainee neural network 110 (e.g., each neural network layer of the trainee neural network 110) using a respective different per-parameter optimizer neural network 150 that is configured as described below. In some implementations, one or more of the neural network layers of the trainee neural network 110 are not trained using a per-parameter optimizer neural network 150; instead, the training system 100 can train the one or more neural network layers using a conventional optimizer, e.g., stochastic gradient descent.

The training system includes the trainee neural network 110, a training engine 130, and the per-parameter optimizer neural network 150.

At each of multiple training stages during the training of the trainee neural network 110, the training engine 130 is configured to process one or more trainee network inputs 102, from a training data set of trainee network inputs 102, using the trainee neural network 110 to generate respective trainee network outputs 112. That is, at each training stage, the trainee neural network 110 can process a respective different batch or mini-batch of training examples from the training data set.

At each training stage and for each network parameter of the parameter tensor of the neural network layer 120, the training engine 130 can use the generated trainee network outputs 112 to generate an optimizer network input 132 for the per-parameter optimizer neural network 150, provide the optimizer network input 132 to the per-parameter optimizer neural network 150 for generating an optimizer network output 152, determine a parameter update 134 for the network parameter using the optimizer network output 152, and update the network parameter by applying the parameter update 134.

In particular, the training engine 130 can process the trainee network outputs 112 generated during the current training stage according to a loss function for the machine learning task in order to determine an error of the trainee network outputs 112. The training engine 130 can use the determined error to generate, for each network parameter of the parameter tensor of the neural network layer 120, a gradient of the loss function with respect to the network parameter. For example, the training engine 130 can back-propagate the error through the trainee neural network 110 to the neural network layer 120 to generate the gradients for the network parameters of the parameter tensor of the neural network layer 120.

The training engine 130 can use any appropriate technique to determine the error of the trainee network outputs 112. For example, if the training data set includes a label for each trainee network input 102 in the training data set that identifies a ground-truth trainee network output that should be generated by the trainee neural network 110 in response to processing the trainee network input 102, then the training engine 130 can use a supervised loss function to determine the error, e.g., by determining the mean squared error or cross entropy loss between the trainee network outputs 112 and the corresponding ground-truth trainee network outputs. As another example, if the training data set does not include labels for the trainee network inputs 102 in the training data set, the training engine 130 can determine the error of the trainee network outputs 112 using any appropriate unsupervised or self-supervised training technique.

The training engine 130 includes a gradient data store 140 that is configured to maintain, for each network parameter of the parameter tensor of the neural network layer 120, data representing historical gradients of the network parameter. For example, the gradient data store 140 can maintain data representing a low-rank approximation for the sequence of gradients generated for the network parameter at respective training stages. Maintaining a low-rank approximation of the sequence of historical gradients, instead of the historical gradients themselves, can significantly improve the memory and computational efficiency of the training engine 130. The gradient data store 140 is sometimes called an "accumulator" because it maintains data representation an accumulation of historical gradients.

For example, the gradient data store 140 can maintain data representing an Adafactor accumulator. An Adafactor optimizer is a hand-designed optimizer that is configured to generate parameter updates for each network parameter in a parameter tensor. The Adafactor optimizer maintains an Adafactor accumulator that tracks a different set of values for each dimension of the parameter tensor; these sets of values represent the low-rank approximation of the historical gradients of the network parameters in the parameter tensor. In particular, for each dimension of the parameter tensor, the Adafactor accumulator maintains a respective value for each index of the dimension.

Thus, for each index of each dimension of the parameter tensor of the neural network layer 120, the gradient data store 140 can maintain a respective value corresponding to the index of the dimension.

In some implementations, the gradient data store 140 stores, for each of one or more sets of multiple indices of a respective dimension, a respective single value representing historical gradients for the network parameters having an index in the set of multiple indices in the dimension. That is, instead of each value corresponding to a single index, some or all of the values stored by the gradient data store 140 can correspond to respective sets of multiple indices. Although the below description generally refers to maintaining a respective value for each index of a dimension, it is to be understood that the same techniques can be applied when values for respective sets of multiple indices of the dimension are maintained.

The value maintained by the gradient data store 140 corresponding to a particular index of a particular dimension of the parameter tensor can represent a moving average of the historical gradients of the parameters of the parameter tensor that have the particular index in the particular dimension. For example, the value can be a moving average of the sum of the historical gradients of the parameters that have the particular index in the particular dimension.

As another example, the value can be a moving average of the squared sum of the historical gradients of the parameters that have the particular index in the particular dimension. As another example, the value can be a moving average, across training stages, of the maximum gradient of the parameters that have the particular index in the particular dimension at each training stage. As another example, the value can be a moving average, across training stages, of the maximum squared gradient of the parameters that have the particular index in the particular dimension at each training stage. As a particular example, if the parameter tensor has dimension M×N, then the gradient data store 140 can maintain M values corresponding to respective rows of the parameter tensor and N values corresponding to respective columns of the parameter tensor. In this specification, the values that correspond to respective indices of respective dimensions of a parameter tensor and that represent moving averages generated from the historical gradients of the parameters having the respective indices of the respective dimensions are called "Adafactor terms." The Adafactor optimizer is discussed in more detail in "Adafactor: Adaptive Learning Rates with Sublinear Memory Cost," Shazeer et al., arXiv:1804.04235, the contents of which are hereby incorporated by reference.

In some implementations, for each index of each dimension of the parameter tensor, the gradient data store 140 can maintain multiple different values (e.g., multiple different Adafactor terms as described above) corresponding to respective different time scales. That is, for each index of each dimension of the parameter tensor, the gradient data store 140 can maintain multiple low-rank approximations of the historical gradients of the network parameters having the index in the dimension corresponding to respective different time scales. For example, the different time scales can be parameterized by weighing new values relative to the maintained values differently when computing the moving averages. That is, when computing the moving average for a shorter time scale, the new value can have a greater weight relative to the existing value than when computing the moving average for a longer time scale. As particular examples, at respective time scales in ascending order of length, the new value can be assigned a weight of 0.5, 0.1, 0.01, or 0.001.

In some such implementations, one or more of the time scales are themselves meta-learned with the training of the per-parameter optimizer neural network 150. For example, the weight that is applied to the new value in the moving average computation can be learned concurrently with the training of the per-parameter optimizer neural network 150. Example techniques for training the per-parameter optimizer neural network 150 are described below.

At each training stage, the training engine 130 can update the gradient data store 140 using the new gradients generated from the trainee network outputs 112 generated at the training stage. That is, for each network parameter, the training engine 130 can use the new gradient for the network parameter to update the data, maintained by the gradient data store 140, representing the historical gradients for the network parameter.

For example, at each training stage, the training engine 130 can update the respective Adafactor terms stored in the gradient data store 140 for each index of each term of the parameter tensor of the neural network layer 120 using the new gradients generated from the trainee network outputs 112 generated at the training stage. As a particular example, if the gradient data store 140 tracks, for each particular index of each particular dimension of the parameter tensor, a respective moving average of the sum (or squared sum) of the gradients of the network parameters having the particular index in the particular dimension, then the training engine 130 can compute, for each particular index of each particular dimension of the parameter tensor, the sum (or squared sum) of the new gradients. As another particular example, if the gradient data store 140 tracks, for each particular index of each particular dimension of the parameter tensor, a respective moving average of the maximum gradient (or squared maximum gradient) of the gradients of the network parameters having the particular index in the particular dimension, then the training engine 130 can compute, for each particular index of each particular dimension of the parameter tensor, the maximum gradient (or squared maximum gradient) of the new gradients. The training engine 130 can then update the moving averages stored in the gradient data store 140.

After updating the values maintained by the gradient data store 140, instead of using the updated values to directly compute updates to the network parameters of the parameter tensor (like the hand-designed Adafactor optimizer described above would), the training engine 130 instead can generate, for each network parameter of the parameter tensor, a respective optimizer network input 132 using the updated values.

In particular, to generate the respective optimizer network input 132 for each network parameter, the training engine 130 can identify each updated value stored in the gradient data store 140 that was generated using the gradient of the network parameter. That is, the training engine 130 can identify, for each dimension of the parameter tensor, the index of the network parameter in the dimension, and then obtain the updated value stored in the gradient data store 140 corresponding to the identified index of the dimension.

In some implementations, for each network parameter of the parameter tensor, the optimizer network input 132 for the network parameter includes the respective obtained values. For example, the optimizer network input 132 can be a vector where at least some of the elements of the vector are values obtained from the gradient data store 140 corresponding to respective dimensions.

In some other implementations, for each network parameter of the parameter tensor, the training engine 130 generates the optimizer network input 132 for the network parameter by updating the respective obtained values. For example, the training engine 130 can process the obtained values to normalize and/or to otherwise modify them, and include the processed values in the optimizer network input 132. As a particular example, the training engine 130 can normalize the values so that the values across the parameter tensor have a second moment of 1.

In some implementations, for each network parameter of the parameter tensor of the neural network layer 120, the optimizer network input 132 for the network parameter includes (or is generated from) one or more other terms in addition to the values maintained by the gradient data store 140 described above. The additional terms can also be stored by the gradient data store 140 during the training of the trainee neural network 140. For example, each optimizer network input 132 can include or be generated from one or more of the following:

the current value of the network parameter;

one or more momentum terms for the gradients of the network parameter, where each momentum term corresponds to a respective different (optionally machine-learned, e.g., learned concurrently with the training of the per-parameter optimizer neural network 150) time scale;

a second moment term for the gradients of the network parameter;

one or more normalized momentum terms (corresponding to respective, optionally machine-learned, time scales) that have been normalized using the second moment term for the gradients of the network parameter, e.g., $-m/\sqrt{v'}$ where m is the raw momentum term and v is the second moment term;

an inverse of a root of a noisy second moment term (e.g., a value generated by adding noise to the second moment value) for the gradients of the network parameter, e.g., ($\sqrt{v+\in}$)$^{-1}$, where $\in$ is either (i) a predetermined value such as 1e-5 or 1e-9 or (ii) a randomly-sampled noise term, e.g., randomly-sampled from a Normal distribution;

one or more terms generated by processing a number of the current training stage using a tanh layer, e.g., $\tanh(t/x)$ where t is the number of the current training stage (i.e., t=1 for the first training stage and so on) and x is a predetermined constant, e.g., x $\in\{1,3,10,30,300,1000,3000,10k,$ $30k,$ $100k\}$;

one or more terms generated by normalizing the new gradient of the network parameter using an Adafactor term (e.g., where each term corresponds to a respective different, optionally machine-learned, time scale for the Adafactor term);

one or more terms generated by normalizing a momentum value of the network parameter using an Adafactor term (e.g., where each term corresponds to a respective different, optionally machine-learned, time scale for the Adafactor term);

one or more tiled Adafactor row terms;

one or more tiled Adafactor column terms; or one or more terms generated by determining an inverse of a root of a tiled Adafactor row or column term.

In this specification, a "tiled" Adafactor row/column term is set of Adafactor terms that have been repeated multiple times, generating a tiled term that has the same dimensionality as the parameter tensor. For example, if the parameter tensor has dimensionality N×M, then as described above there can be N Adafactor terms corresponding to respective rows (called Adafactor row terms) and M Adafactor terms corresponding to respective columns (called Adafactor column terms) of the parameter tensor. The N Adafactor row terms can be repeated (or "tiled")M times to generate a tensor of size N×M, called a tiled Adafactor row term. Similarly, the M Adafactor column terms can be tiled N times to generate a tensor of size N×M, called a tiled Adafactor column term.

After generating the respective optimizer network input 132 for each network parameter of the parameter tensor of the neural network layer 120, the training engine 130 can provide the optimizer network inputs 132 to the per-parameter optimizer neural network 150. For each network parameter, the per-parameter optimizer neural network 150 can then process the optimizer network input 132 to generate an optimizer network output 152 defining a parameter update 134 for the network parameter.

In some implementations, the per-parameter optimizer neural network 150 processes at least some of the optimizer network inputs 132 corresponding to respective network parameters in parallel. For example, the per-parameter optimizer neural network 150 can process the optimizer network input 132 for each network parameter in the parameter tensor in parallel.

The per-parameter optimizer neural network 150 can have any appropriate network architecture. The per-parameter optimizer neural network 150 can be designed to have a low latency and/or computational cost (e.g., can include relatively few network parameters), so that the execution of the per-parameter optimizer neural network 150 does not significantly increase the time and/or computational cost of training the trainee neural network 110 relative to other optimizers, e.g., relative to using gradient descent. For example, the per-parameter optimizer neural network 150 can have a smaller depth (i.e., number of neural network layers) and/or a smaller width (i.e., number of neurons per layer) than other existing learned optimizers.

For example, the per-parameter optimizer neural network 130 can include one or more feedforward neural network layers. As a particular example, the per-parameter optimizer neural network 130 can be a multi-layer perceptron (MLP) with a single fully-connected hidden layer. The hidden layer can have a very small width, e.g., a width of four or fewer.

In some implementations, the per-parameter optimizer neural network 150 can be implemented on parallel processing devices, e.g., special-purpose hardware such as tensor processing units (TPUs), for efficient execution at training and/or inference time. As a particular example, the per-parameter optimizer neural network 150 can be implemented on special-purpose hardware that includes specialized matrix multiplication units that operate on fixed-dimensional matrices (e.g., the TPUv2 hardware includes 128×128 systolic arrays). In some implementations, utilizing these specialized matrix multiplication units can significantly improve the efficiency of the implementation of the per-parameter optimizer neural network 150 on the parallel processing device. In some other implementations, for at least some of the matrix multiplications in the implementation of the per-parameter optimizer neural network 150, the size of the matrices in the matrix multiplication is significantly smaller than the fixed-dimensional matrices for which the specialized matrix multiplication units of the parallel processing device have been configured, which can cause inefficiencies because of underutilization of the specialized matrix multiplication units. Thus, these matrix multiplications can instead be implemented in the parallel processing device as a set of vector multiplications or element-wise operations, significantly improving the efficiency of the per-parameter optimizer neural network 150 relative to a naïve implementation that implements the matrix multiplications using the specialized matrix multiplication units (e.g., the time required to execute the per-parameter optimizer neural network 150 can be halved).

For each network parameter of the parameter tensor of the neural network layer 120, the corresponding optimizer network output 152 can define a parameter update 134 for the network parameter in any appropriate way. For example, the optimizer network output 152 can be a single value representing the parameter update 134; that is, the parameter update 134 can be applied by adding the single value of the optimizer network output 152 to the current value for the network parameter.

As another example, the optimizer network output 152 for each network parameter can include two elements: a first element whose value defines a scalar direction d of the parameter update 134 for the network parameter and a second element whose value defines a magnitude m of the parameter update 134 for the network parameter. As a particular example, the training engine 130 can determine the parameter update $\Delta\phi$ for the current value $\phi$ of the network parameter to be:

$$\Delta\phi = \lambda_1 \cdot d \cdot \exp(\lambda_2 \cdot m)$$

where $\lambda_1$, and $\lambda_2$ are predetermined constants that dictate the step size of the parameter update.

As another example, the optimizer network output 152 for each network parameter can include three elements: a scalar direction d of the parameter update 134 for the network parameter, a magnitude $m_b$ of the parameter update 134 for the network parameter, and a term $m_g$ used as a magnitude controller on a nominal term added to the parameter update 134, as described in more detail below.

After receiving the optimizer network output 152 for each network parameter, the training engine 130 can generate the parameter update 134 for the network parameter from the optimizer network output 152 and apply the parameter update 134 to update the current value of the network parameter.

In some implementations, after determining a parameter update for each network parameter of the parameter tensor of the neural network layer 120 from the respective optimizer network output 152, the training engine 130 can further process the determined parameter update before applying the parameter update. That is, the training engine 130 can generate an initial parameter update from the optimizer network output 152, and update the initial parameter update to generate the final parameter update 134 for the network parameter.

For example, for each network parameter, the training engine 130 can add a nominal term to the initial parameter update, where the nominal term biases the initial parameter update in the direction of descent on the loss landscape defined by the loss function for the machine learning task of the trainee neural network 110. For example, the training engine 130 can determine the nominal term from the gradient for the network parameter using a hand-designed optimizer such as Adam, Aggregated Momentum (AggMo), or both, and add the nominal term (or a weighted version of the nominal term) to the initial parameter update to generate the final parameter update 134. That is, the nominal term represents the parameter update (or a weighted version thereof) that would be applied to the network parameter by the hand-designed optimizer. As a particular example, the training engine 130 can generate a first nominal term by processing the gradient using Adam, generate a second nominal term by processing the gradient using AggMo, and generate the final nominal term by determining the sum or mean of the first nominal term and the second nominal term.

In some such implementations, the training engine 130 can apply a magnitude controller to the nominal term before adding the nominal term to the initial parameter update for the network parameter. The magnitude controller can be a single value used to control the magnitude of the nominal term. For example, the training engine 130 can clip the absolute value of the nominal term to have a particular upper bound defined by the magnitude controller before adding the nominal term to the initial parameter update. As another example, the training engine 130 can multiply the nominal term by the magnitude controller or divide the nominal term by the magnitude controller before adding the nominal term to the initial parameter update. As a particular example, the training engine 130 can determine the magnitude controller from the optimizer network output 152 for the network parameter, e.g., the magnitude controller can be a particular element of the optimizer network output 152. As another particular example, the training engine 130 can determine the magnitude controller from a particular element of the optimizer network output 152 for the network parameter, e.g., by normalizing the particular element and/or applying the exponential function to the particular element.

As another example, instead of or in addition to adding a nominal term to the initial parameter update, the training engine 130 can normalize the initial parameter update by a conditioning value, e.g., by dividing the initial parameter update by the conditioning value. For example, the training engine 130 can determine the conditioning value from the gradient for the network parameter using a hand-designed optimizer such as Adam, AggMo, or both. As a particular example, the training engine 130 can generate a first conditioning value by processing the gradient using Adam, generate a second conditioning value by processing the gradient using AggMo, and generate the final conditioning value by determining the sum or mean of the first conditioning value and the second conditioning value.

As a particular example, the training engine 130 can compute the final update $f(z_t)$ for the current value of each network parameter, given the current values $z_t$ maintained by the gradient data store 140, to be:

$$f(z_t) = f_b(z_t) + f_g(z_t)$$

$$f_g(z_t) = \beta_1 \exp(\beta_2 m_g(z_t)) g(z_t)$$

$$f_b(z_t) = \beta_3 \frac{d(z_t)}{v(z_t)} \exp(\beta_4 m_b(z_t))$$

where $g(\cdot)$ is the nominal term, $m_g(\cdot)$ is the magnitude controller for the nominal term, $d(\cdot)$ is the direction of the parameter update 134 determined from the optimizer network output 152 as described above, $m_b(\cdot)$ is the magnitude of the parameter update 134 determined from the optimizer network output 152 as described above, $v(\cdot)$ is the conditioning value, and $\beta_1$, $\beta_2$, $\beta_3$, and $\beta_4$ are predetermined constants.

The training system 100 can determine to end training of the trainee neural network 110 in any appropriate way. For example, the training system 100 can determine to end training after a predetermined number of training stages. As another example, the training system 100 can determine to end training when a predetermined performance (e.g., a training or validation accuracy) of the trainee neural network 110 is achieved. As another example, the training system 100 can determine to end training when a marginal improvement in the performance (e.g., in the training or validation accuracy) of the trainee neural network 110 between respective training stages drops below a predetermined threshold.

After the trainee neural network 110 is trained (i.e., after the final training stage of the training system 100), the trainee neural network 110 can be deployed in any appropriate inference environment. For example, the trainee neural network 110 can be deployed in a cloud computing environment such as a data center, or on a user device such as a mobile phone, tablet, or laptop. Typically, the per-parameter optimizer neural network 150 is not deployed with the trainee neural network 110; that is, after training, the trainee neural network 110 can operate without the per-parameter optimizer neural network 150. After deployment, the trainee neural network 110 can receive new trainee network inputs 102 and process the new trainee network inputs 102 according to the trained values for the network parameters of the trainee neural network 110 to generate new trainee network outputs 112 for the new trainee network inputs 102.

The per-parameter optimizer neural network 150 can be trained in any appropriate way. Generally, a training system can train the per-parameter optimizer neural network 150 using a set of one or more trainee neural networks (which may or may not include the trainee neural network 110) configured to performs respective machine learning tasks, e.g., the same machine learning task or respective different machine learning tasks. The training system can use the per-parameter optimizer neural network 150 to execute a number of training stages of the trainee neural networks, and update the network parameters of the per-parameter optimizer neural network 150 based on an average error (e.g., as measured by training or validation loss) of the trainee neural networks across the training stages.

As a particular example, the training system can train the per-parameter optimizer neural network 150 using a persistent evolution strategies (PES) technique that performs an evolution-based parameter update after each of multiple unrolls of the executions of the trainee neural networks. PES techniques are discussed in more detail in "Unbiased gradient estimation in unrolled computation graphs with persistent evolution strategies," Vicol et al., arXiv:2112.13835.

In some implementations, the respective machine learning tasks of the trainee neural networks on which the per-parameter optimizer neural network 150 is trained are different from the particular machine learning task for which the trainee neural network 110 is configured. That is, the per-parameter optimizer neural network 150 can be used to train trainee neural networks 110 for machine learning tasks for which the per-parameter optimizer neural network 150 was not trained to generate parameter updates.

In some implementations, during training of the per-parameter optimizer neural network 150, the training system for the per-parameter optimizer neural network 150 can apply a relatively heavy weight decay to the network parameters of the per-parameter optimizer neural network 150, e.g., by applying L_2 regularization. This weight decay can help prevent oscillation of the parameter updates 134 to the trainee neural network 110, i.e., can perform magnitude control on the parameter updates 134 determined from the optimizer network outputs 152 generated by the per-parameter optimizer neural network 150.

The trainee neural network 110 can be trained to perform any appropriate machine learning task, i.e., can be configured to receive any appropriate kind of digital data input 102 and to generate any appropriate kind of score, classification, or regression output based on the input 102.

For example, the trainee neural network 110 can be configured to perform an image processing task, i.e., receive an input image and to process the input image, i.e., to process the intensity values of the pixels of the input image, to generate a network output for the input image. For example, the task may be image classification and the output generated by the trainee neural network for a given image may be scores for each of a set of object categories, with each score representing an estimated likelihood that the image contains an image of an object belonging to the category. As another example, the task can be image embedding generation and the output generated by the trainee neural network can be a numeric embedding of the input image. As yet another example, the task can be object detection and the output generated by the trainee neural network can identify locations in the input image at which particular types of objects are depicted. As yet another example, the task can be image segmentation and the output generated by the trainee neural network can assign each pixel of the input image to a category from a set of categories.

As another example, if the inputs 102 to the trainee neural network 110 are Internet resources (e.g., web pages), documents, or portions of documents or features extracted from Internet resources, documents, or portions of documents, the task can be to classify the resource or document, i.e., the output generated by the trainee neural network 110 for a given Internet resource, document, or portion of a document may be a score for each of a set of topics, with each score representing an estimated likelihood that the Internet resource, document, or document portion is about the topic.

As another example, if the inputs 102 to the trainee neural network 110 are features of an impression context for a particular advertisement, the output generated by the trainee neural network 110 may be a score that represents an estimated likelihood that the particular advertisement will be clicked on.

As another example, if the inputs 102 to the trainee neural network 110 are features of a personalized recommendation for a user, e.g., features characterizing the context for the recommendation, e.g., features characterizing previous actions taken by the user, the output generated by the trainee neural network 110 may be a score for each of a set of content items, with each score representing an estimated likelihood that the user will respond favorably to being recommended the content item.

As another example, if the input 102 to the trainee neural network 110 is a sequence of text in one language, the output generated by the trainee neural network 110 may be a score for each of a set of pieces of text in another language, with each score representing an estimated likelihood that the piece of text in the other language is a proper translation of the input text into the other language.

As another example, the task may be an audio processing task. For example, if the input 102 to the trainee neural network 110 is a sequence representing a spoken utterance, the output generated by the trainee neural network 110 may be a score for each of a set of pieces of text, each score representing an estimated likelihood that the piece of text is the correct transcript for the utterance. As another example, the task may be a keyword spotting task where, if the input 102 to the trainee neural network 110 is a sequence representing a spoken utterance, the output generated by the trainee neural network 110 can indicate whether a particular word or phrase ("hotword") was spoken in the utterance. As another example, if the input 102 to the trainee neural network 110 is a sequence representing a spoken utterance, the output generated by the trainee neural network 110 can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input 102 is text in a natural language or features of text in a natural language and the network output is a spectrogram or other data defining audio of the text being spoken in the natural language.

As another example, the task can be a health prediction task, where the input 102 is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input 102 is an observation characterizing the state of an environment and the output defines an action to be performed by the agent in response to the observation. The agent can be, e.g., a real-world or simulated robot, a control system for an industrial facility, or a control system that controls a different kind of agent.

FIG. 2 is a flow diagram of an example process 200 for training a trainee neural network using a per-parameter optimizer neural network. For convenience, the process 200 will be described as being performed by a system of one or more computers located in one or more locations. For example, a training system, e.g., the training system 100 described above with reference to in FIG. 1, appropriately programmed in accordance with this specification, can perform the process 200.

The system can train the trainee neural network to perform a machine learning task by processing a network input to generate a network output. The trainee neural network can include a neural network layer that is configured to process a layer input in accordance with at least a parameter tensor to generate a layer output. The parameter tensor can include multiple network parameters and can have a multiple dimensions each having a respective set of multiple indices.

For each dimension of the multiple dimensions of the parameter tensor of the neural network layer, the system maintains a set of values, where each value corresponds to a respective different set of one or more indices of the set of indices of the dimension, and where the value corresponding to each set of one or more indices represents a measure of central tendency of past gradients of the network parameters of the parameter tensor having an index in the dimension that is in the set of one or more indices (step 202).

The system can perform steps 204-212 at each of multiple training stages for the trainee neural network.

The system performs, using one or more training examples, a training step to obtain respective new gradients of a loss function for the machine learning task with respect to each of the multiple network parameters of the parameter tensor (step 204).

The system updates, for each dimension of the multiple dimensions of the parameter tensor, the corresponding set of values using the new gradients (step 206).

The system can perform steps 208-212 for each of the network parameters of the parameter tensor of the neural network layer. For example, the system can perform the steps 208-212 for each network parameter in parallel.

The system generates an optimizer network input for the network parameter from at least the updated sets of values of the multiple dimensions of the parameter tensor (step 208).

The system processes the optimizer network input using the optimizer neural network to generate an optimizer network output defining an update for the network parameter (step 210). For example, the optimizer neural network can be the per-parameter optimizer neural network 150 described above with reference to FIG. 1.

The system applies the update to the current value of the network parameter to generate an updated value for the network parameter (step 212).

Figure 3:
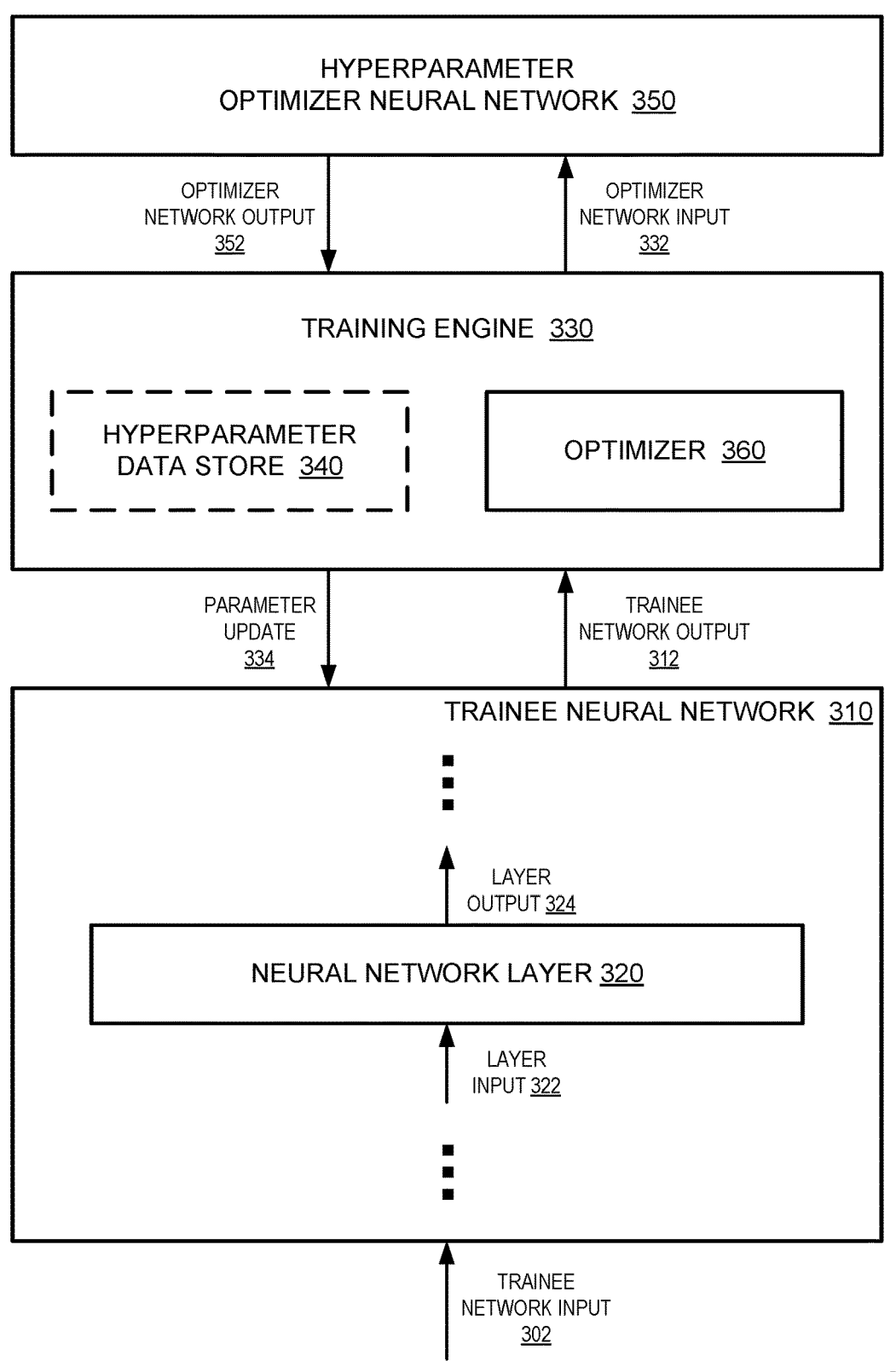
FIG. 3 is a diagram of an example training system that includes a hyperparameter optimizer neural network.

FIG. 3 is a diagram of an example training system 300 that includes a hyperparameter optimizer neural network 350. The training system 300 is an example of a system implemented as computer programs on one or more computers in one or more locations, in which the systems, components, and techniques described below can be implemented.

The training system 300 is configured to train a trainee neural network 310 to perform a machine learning task. The trainee neural network 310 can be configured to process a trainee network input 302 and to generate a trainee network output 312 that represents a prediction about the trainee network input 302 for the machine learning task.

In particular, the training system 300 can use the hyperparameter optimizer neural network 350 (also called simply an optimizer neural network 350) to train a particular neural network layer 320 of the trainee neural network 310. The neural network layer 320 can be configured to process a layer input 322 using at least a parameter tensor to generate a layer output 324. The parameter tensor can include multiple network parameters.

The neural network layer 320 can be any appropriate type of neural network layer, e.g., a feedforward neural network layer, a convolutional neural network layer, a recurrent neural network layer, or a self-attention neural network layer.

At each of multiple training stages as described in more detail below, the hyperparameter optimizer neural network 350 can process an optimizer network input 332 corresponding to the parameter tensor of the neural network layer 320 and generate an optimizer network output 352 that represents a set of one or more hyperparameters of an optimizer 360 that is configured to generate a parameter update 334 for the network parameters of the parameter tensor. That is, after the hyperparameter optimizer neural network 350 generates the optimizer network output 352, the optimizer 360 can generate the parameter update 334 for the network parameters of the parameter tensor according to the hyperparameters defined by the optimizer network output 352.

That is, the optimizer neural network 350 is called a "hyperparameter" optimizer neural network because the optimizer neural network 350 is configured to generate optimizer network outputs 352 that represent hyperparameters of the optimizer. Referring to the optimizer neural network 350 as a hyperparameter optimizer neural network should not be interpreted as limiting the nature of the operations that can be performed by the optimizer neural network or otherwise implicitly characterizing the optimizer neural network.

The optimizer 360 whose hyperparameters are defined by the optimizer network output 352 can be any appropriate optimizer. For example, the optimizer 360 can itself be a learned optimizer that includes one or more parameters that have been machine-learned. As another example, the optimizer 360 can be a hand-designed optimizer, i.e., an optimizer that does not include any parameters that are machine-learned.

For example, the optimizer 360 can be an optimizer configured to generate, for each network parameter, a parameter update 334 from (i) the gradient for the network parameter from the current training stage and (ii) an exponential moving average of the first moment of the gradients of the network parameter, an exponential moving average of the second moment of the gradients of the network parameter, or both. For instance, the hyperparameters for an optimizer that generates parameter updates 334 from these inputs can include an exponential decay rate #1? for the exponential moving average of the first moment of the gradients of the network parameter, an exponential decay rate $\beta_2$ for the exponential moving average of the second moment of the gradients of the network parameter, or both.

As a particular example, the optimizer 360 can be an Adam optimizer. The Adam optimizer can be parameterized by the following hyperparameters: a learning rate or step size (often represented by a); the exponential decay rate $\beta_1$ for the first moment moving average; the exponential decay rate $\beta_2$ for the second moment moving average; and an epsilon term $\in$, e.g., used to prevent division by zero. The Adam optimizer can perform the following computations to apply the parameter update 334 for a network parameter:

$$m_t \leftarrow \beta_1 \cdot m_{t-1} + (1 - \beta_1) \cdot g_t$$

$$v_t \leftarrow \beta_2 \cdot v_{t-1} + (1 - \beta_2) \cdot g_t^2$$

$$\hat{m}_t \leftarrow m_t/(1 - \beta_1^t)$$

$$\hat{v}_t \leftarrow v_t/(1 - \beta_2^t)$$

$$\theta_t \leftarrow \theta_{t-1} - \alpha \cdot \hat{m}_t/\left(\sqrt{\hat{v}_t} + \epsilon\right)$$

where $m_t$ is the exponential moving average of the first moment of the gradients of the network parameter, $v_t$ is the exponential moving average of the second moment of the gradients of the network parameter, $g_t$ is the gradient of the network parameter from the current training stage, $\theta_{t-1}$ is the current value for the network parameter, and $\theta_t$ is the updated value for the network parameter.

Adam optimizers are discussed in more detail in "Adam: A Method for Stochastic Optimization," Kingma and Ba, arXiv:1412.6980.

As other particular examples, the optimizer 360 can be a variant of the Adam optimizer, e.g., Nesterov-accelerated Adam (NAdam) (as described in "Incorporating Nesterov Momentum into Adam," Timothy Dozat, 2016) or Adam with decoupled weight decay (AdamW) (as described in "Decoupled Weight Decay Regularization," Loshchilov and Hutter, arxiv:1711.05101).

In some implementations, e.g., if the neural network layer 320 is a self-attention neural network layer as described above, the neural network layer 320 can include multiple different parameter tensors, where at least one of the parameter tensors are trained using the hyperparameter optimizer neural network 350 as described below.

The trainee neural network 310 can include multiple neural network layers. In some implementations, the training system 300 trains multiple different neural network layers of the trainee neural network 310 using the hyperparameter optimizer neural network 350 as described below. For example, the training system 300 can train each neural network layer of the trainee neural network 310 using the same hyperparameter optimizer neural network 350. In some other implementations, the training system 300 trains each of multiple different neural network layers of the trainee neural network 310 (e.g., each neural network layer of the trainee neural network 310) using a respective different hyperparameter optimizer neural network 350 that is configured as described below. In some implementations, one or more of the neural network layers of the trainee neural network 310 are not trained using a hyperparameter optimizer neural network 350; instead, the training system 300 can train the one or more neural network layers using a conventional optimizer, e.g., stochastic gradient descent.

The training system 300 includes the trainee neural network 310, a training engine 330, and the hyperparameter optimizer neural network 350.

At each of multiple training stages during the training of the trainee neural network 310, the training engine 330 is configured to process one or more trainee network inputs 302, from a training data set of trainee network inputs 302, using the trainee neural network 310 to generate respective trainee network outputs 312. The training engine 130 can then use the generated trainee network outputs 312 to generate an optimizer network input 332 for the hyperparameter optimizer neural network 350, provide the optimizer network input 332 to the hyperparameter optimizer neural network 350 for generating an optimizer network output 352, determine hyperparameters for the optimizer 360 using the optimizer network output 352, generate a parameter update 334 for the network parameters of the parameter tensor of the neural network layer 320 using the optimizer 360 according to the determined hyperparameters, and update the network parameters by applying the parameter update 334.

In particular, the training engine 330 can process the trainee network outputs 312 generated during the current training stage according to a loss function for the machine learning task in order to determine an error of the trainee network outputs 312. The training engine 330 can use the determined error to generate, for each network parameter of the parameter tensor of the neural network layer 320, a gradient of the loss function with respect to the network parameter, e.g., as described above with reference to FIG. 1.

The training engine 330 can generate the optimizer network input 332 from the gradients of the network parameters of the parameter tensor. In some implementations, the training engine 330 can further generate the optimizer network input 332 from data representing historical gradients of the network parameters, i.e., the gradients of the network parameters determined at respective previous training stages of the training system 300. That is, across the training stages, the training engine 330 can maintain data representing a measure of central tendency of the gradients of the network parameters.

For example, the optimizer network input 332 can include or be generated from one or more of the following:

a mean momentum of the parameters of the parameter tensor;

a sign of the mean momentum of the parameters of the parameter tensor;

a variance squared of the momentum of the parameters of the parameter tensor;

a mean of a second moment term of the gradients of the parameters of the parameter tensor;

a sign of the mean of the second moment term of the gradients of the parameters of the parameter tensor;

a mean of the current values of the network parameters of the parameter tensor; a sign of the mean of the current values of the network parameters of the parameter tensor;

a variance squared of the current values of the network parameters of the parameter tensor;

a mean of the gradients of the parameters of the parameter tensor;

a sign of the mean of the gradients of the parameters of the parameter tensor;

a variance squared of the gradients of the parameters of the parameter tensor;

a mean absolute value of the gradients of the parameters of the parameter tensor.

In some implementations, one or more of the above terms can be transformed before they are used to generate the optimizer network input 332. For example, the training engine 330 can compute the log of the absolute value of the term to generate a first updated term, clip the first updated term to generate a second updated term (e.g., clip the first updated term to be between −5 and 5), and rescale the second updated term to generate a final updated term (e.g., rescale the second updated term by 0.5).

After generating the optimizer network input 332 for the parameter tensor of the neural network layer 320, the training engine 330 can provide the optimizer network input 332 to the hyperparameter optimizer neural network 350. The hyperparameter optimizer neural network 350 can then process the optimizer network input 332 to generate an optimizer network output 352 defining the hyperparameters of the optimizer 360.

The hyperparameter optimizer neural network 350 can have any appropriate network architecture. The hyperparameter optimizer neural network 350 can be designed to have a low latency and/or computational cost (e.g., can include relatively few network parameters), so that the execution of the hyperparameter optimizer neural network 350 does not significantly increase the time and/or computational cost of training the trainee neural network 310 relative to other optimizers, e.g., relative to using gradient descent.

For example, the hyperparameter optimizer neural network 350 can be a recurrent neural network that is configured to execute a respective recurrent step at each training stage of the training system 300. That is, the hyperparameter optimizer neural network 350 can maintain an internal state across the training stages, and at each training stage process (i) the optimizer network input 332 for the current training stage and (ii) the internal state to generate (i) the optimizer network output 352 for the current training stage and (ii) an updated internal state). As a particular example, the hyperparameter optimizer neural network 350 can be a long short-term memory (LSTM) neural network.

In some implementations, the hyperparameter optimizer neural network 350 can be implemented on parallel processing devices, e.g., special-purpose hardware such as tensor processing units (TPUs), for efficient execution at training and/or inference time. As a particular example, the hyperparameter optimizer neural network 350 can be implemented on special-purpose hardware that includes specialized matrix multiplication units that operate on fixed dimensional matrices (e.g., the TPUv2 hardware includes 128×128 systolic arrays). In some implementations, utilizing these specialized matrix multiplication units can significantly improve the efficiency of the implementation of the hyperparameter optimizer neural network 350 on the parallel processing device. In some other implementations as described above with reference to FIG. 1, the matrix multiplication operations in the implementation of the hyperparameter optimizer neural network 350 can explicitly expanded into vector or element-wise operations, thus significantly improving the efficiency of the hyperparameter optimizer neural network 350 relative to a naïve implementation (e.g., the time required to execute the hyperparameter optimizer neural network 350 can be halved).

The optimizer network output 352 can define the hyperparameters for the optimizer 360 in any appropriate way. For example, the optimizer network output 352 can be a tensor of elements where each element is the value for a respective hyperparameter of the optimizer 360. As a particular example, if the optimizer 360 is an Adam optimizer, the optimizer network output 352 can include four elements representing the $\alpha, \beta_1, \beta_2$, and $\in$ hyperparameters described above.

As another example, the optimizer network output 352 can include transformed versions of the hyperparameters of the optimizer 360, and the training engine 330 can recover the hyperparameters from the transformed versions. As a particular example, if the optimizer 360 is an Adam optimizer, the optimizer network output 352 can include the following for elements: $\log(\alpha)$, $\log(1-\beta_1)$, $\log(1-\beta_2)$, and $\log(\in)$.

In some implementations, the training engine 352 maintains a hyperparameter data store 340 that stores current values for the hyperparameters of the optimizer 360, and the optimizer network output 352 defines an update to the current values of the hyperparameters (rather than independently defining the hyperparameters themselves). In these implementations, the training engine 330 can determine the update to the hyperparameters of the optimizer 360 from the optimizer network output 352, and update the current values for the hyperparameters stored in the hyperparameter data store 340 according to the determined update to generate the new values for the hyperparameters.

After determining the hyperparameters for the optimizer 360, the training engine 330 can use execute the optimizer 360 according to the hyperparameters to generate the parameter update 334 for the network parameters of the neural network layer 320, and apply the parameter update 334 to update the current values of the network parameters.

The training system 300 can determine to end training of the trainee neural network 310 in any appropriate way, e.g., as described above with reference to FIG. 1.

After the trainee neural network 310 is trained (i.e., after the final training stage of the training system 300), the trainee neural network 310 can be deployed in any appropriate inference environment, e.g., as described above with reference to FIG. 1.

The hyperparameter optimizer neural network 350 can be trained in any appropriate way. Generally, a training system can train the hyperparameter optimizer neural network 350 using a set of one or more trainee neural networks (which may or may not include the trainee neural network 310) configured to do respective machine learning tasks, e.g., the same machine learning task or respective different machine learning tasks. The training system can use the hyperparameter optimizer neural network 350 to execute a number of training stages of the trainee neural networks, and update the network parameters of the hyperparameter optimizer neural network 350 based on an average error (e.g., as measured by training or validation loss) of the trainee neural networks across the training stages. As a particular example, the training system can train the per-parameter optimizer neural network 350 using a PES technique.

In some implementations, the respective machine learning tasks of the trainee neural networks on which the hyperparameter optimizer neural network 350 is trained are different from the particular machine learning task for which the trainee neural network 310 is configured. That is, the hyperparameter optimizer neural network 350 can be used to train trainee neural networks 310 for machine learning tasks for which the hyperparameter optimizer neural network 350 was not trained to generate optimizer hyperparameters.

The trainee neural network 310 can be trained to perform any appropriate machine learning task, e.g., one of the machine learning tasks described above with reference to FIG. 1.

FIG. 4 is a flow diagram of an example process 400 for training a trainee neural network using a hyperparameter optimizer neural network. For convenience, the process 400 will be described as being performed by a system of one or more computers located in one or more locations. For example, a training system, e.g., the training system 300 described above with reference to in FIG. 3, appropriately programmed in accordance with this specification, can perform the process 400.

The system can train the trainee neural network to perform a machine learning task by processing a network input to generate a network output. The trainee neural network can include a neural network layer that is configured to process a layer input in accordance with at least a parameter tensor to generate a layer output. The parameter tensor can include multiple network parameters.

The system can perform the process 400 at each of multiple training stages of the trainee neural network.

The system performs, using one or more training examples, a training step to obtain respective new gradients of a loss function for the machine learning task with respect to each of the multiple network parameters of the neural network layer (step 404).

The system generates an optimizer network input from at least the respective new gradients (step 406).

The system processes the optimizer network input using an optimizer neural network to generate an optimizer network output defining one or more hyperparameter values of an optimizer (step 408). The optimizer neural network can be a recurrent neural network configured to maintain an internal state across training stages. For example, the optimizer neural network can be the optimizer neural network 350 described above with reference to FIG. 3. The optimizer can be an Adam optimizer.

For each of the multiple network parameters of the neural network layer, the system generates an updated value for the network parameter using the optimizer according to the hyperparameter values (step 410).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network configured to perform a machine learning task by processing a network input to generate a network output,
wherein the neural network comprises a neural network layer that is configured to process a layer input in accordance with at least a parameter tensor to generate a layer output, the parameter tensor comprising a plurality of network parameters and having a plurality of dimensions each having a respective plurality of indices,
the method comprising:
for each dimension of the plurality of dimensions:
maintaining a set of historical gradient values, each historical gradient value corresponding to a respective different set of one or more indices of the plurality of indices of the dimension, wherein the historical gradient value corresponding to each set of one or more indices represents a measure of central tendency of past gradients of the network parameters of the parameter tensor having an index in the dimension that is in the one or more indices; and
repeatedly performing the following:
performing, using a plurality of training examples, a training step to obtain respective new gradients of a loss function for the machine learning task with respect to each of the plurality of network parameters of the parameter tensor;
updating, for each set of one or more indices of each dimension of the plurality of dimensions, the corresponding set of historical gradient values for the set of one or more indices using the new gradients of network parameters having an index along the dimension that is in the set of one or more indices; and
for each network parameter of the plurality of network parameters of the parameter tensor:
generating an optimizer network input from at least the updated sets of historical gradient values of the plurality of dimensions, comprising:
for each dimension of the plurality of dimensions, identifying a respective particular value, from the updated set of historical gradient values corresponding to the dimension, that corresponds to the index of the network parameter in the dimension; and
generating the optimizer network input from at least the respective particular values for the plurality of dimensions;
processing the optimizer network input using an optimizer neural network to generate an optimizer network output defining an update for the network parameter; and
applying the update to a current value of the network parameter to generate an updated value for the network parameter.

2. The method of claim 1, wherein updating, for each dimension of the plurality of dimensions, the corresponding set of values using the new gradients comprises:
for each value in the set of values:
obtaining the respective new gradient of each network parameter having an index in the dimension that is in the one or more indices corresponding to the value;
determining a new value that is a sum or a weighted sum of the obtained new gradients; and
determining a moving average between (i) the value and (ii) the new value.

3. The method of claim 1, wherein updating, for each dimension of the plurality of dimensions, the corresponding set of values using the new gradients comprises:
for each value in the set of values:
obtaining the respective new gradient of each network parameter having an index in the dimension that is in the one or more indices corresponding to the value;

for each obtained new gradient, processing the new gradient to generate a respective processed gradient;

determining a new value that is a sum or a weighted sum of the processed gradients; and determining a moving average between (i) the value and (ii) the new value.

4. The method of claim 3, wherein processing the new gradient comprises squaring the new gradient.

5. The method of claim 1, further comprising:

for each dimension of the plurality of dimensions, maintaining a plurality of different sets of values that each correspond to a respective different time scale for the measures of central tendency of the past gradients.

6. The method of claim 5, wherein at least one time scale is machine-learned.

7. The method of claim 1, wherein the optimizer network output comprises (i) a first element defining a magnitude of the update for the network parameter and (ii) a second element defining a direction of the update for the network parameter.

8. The method of claim 7, wherein, for each network parameter of the plurality of network parameters of the parameter tensor, the update for the network parameter is generated by performing operations comprising:

determining, using the first element and the second element of the optimizer network output, an initial update;

generating a nominal term by processing at least the new gradient of the loss function with respect to the network parameter using an optimizer; and adding the nominal term to the initial update to generate the update for the network parameter.

9. The method of claim 8, wherein:

the optimizer network output further comprises a third element defining a magnitude controller for the nominal term, and generating the nominal term comprises applying the magnitude controller defined by the third element to the nominal term.

10. The method of claim 8, wherein determining the initial update comprises:

determining a first update using the first element and the second element of the optimizer network output;

generating a conditioning value by processing at least the new gradient of the loss function with respect to the network parameter using a second optimizer; and normalizing the first update using the conditioning value to generate the initial update.

11. The method of claim 1, wherein the optimizer neural network is a multi-layer perceptron (MLP).

12. The method of claim 11, wherein a width of the MLP is no larger than 4.

13. The method of claim 1, wherein the optimizer network input corresponding to a network parameter is further generated from one or more of:

one or more momentum terms for the network parameter;

a second moment term for the gradients of the network parameter;

one or more normalized momentum terms that have been normalized using a second moment value for the gradients of the network parameter;

an inverse of a root of a noisy second moment value for the gradients of the network parameter;

the current value of the network parameter;

one or more terms generated by processing a current time step using a tanh layer;

one or more terms generated by normalizing the new gradient of the network parameter using an Adafactor term;

one or more terms generated by normalizing a momentum value of the network parameter using an Adafactor term;

one or more tiled Adafactor row terms;

one or more tiled Adafactor column terms; or one or more terms generated by determining an inverse of a root of a tiled Adafactor row or column term.

14. A system comprising one or more computers and one or more storage devices storing instructions that are operable, when executed by the one or more computers, to cause the one or more computers to perform operations of training a neural network configured to perform a machine learning task by processing a network input to generate a network output, wherein the neural network comprises a neural network layer that is configured to process a layer input in accordance with at least a parameter tensor to generate a layer output, the parameter tensor comprising a plurality of network parameters and having a plurality of dimensions each having a respective plurality of indices, the operations comprising:

for each dimension of the plurality of dimensions:

maintaining a set of historical gradient values, each historical gradient value corresponding to a respective different set of one or more indices of the plurality of indices of the dimension, wherein the historical gradient value corresponding to each set of one or more indices represents a measure of central tendency of past gradients of the network parameters of the parameter tensor having an index in the dimension that is in the one or more indices; and repeatedly performing the following:

performing, using a plurality of training examples, a training step to obtain respective new gradients of a loss function for the machine learning task with respect to each of the plurality of network parameters of the parameter tensor;

updating, for each set of one or more indices of each dimension of the plurality of dimensions, the corresponding set of historical gradient values for the set of one or more indices using the new gradients of network parameters having an index along the dimension that is in the set of one or more indices; and for each network parameter of the plurality of network parameters of the parameter tensor:

generating an optimizer network input from at least the updated sets of historical gradient values of the plurality of dimensions, comprising:

for each dimension of the plurality of dimensions, identifying a respective particular value, from the updated set of historical gradient values corresponding to the dimension, that corresponds to the index of the network parameter in the dimension; and generating the optimizer network input from at least the respective particular values for the plurality of dimensions;

processing the optimizer network input using an optimizer neural network to generate an optimizer network output defining an update for the network parameter; and applying the update to a current value of the network parameter to generate an updated value for the network parameter.

15. The system of claim 14, wherein updating, for each dimension of the plurality of dimensions, the corresponding set of values using the new gradients comprises:
  for each value in the set of values:
    obtaining the respective new gradient of each network parameter having an index in the dimension that is in the one or more indices corresponding to the value;
    determining a new value that is a sum or a weighted sum of the obtained new gradients; and
    determining a moving average between (i) the value and (ii) the new value.

16. The system of claim 14, wherein updating, for each dimension of the plurality of dimensions, the corresponding set of values using the new gradients comprises:
  for each value in the set of values:
    obtaining the respective new gradient of each network parameter having an index in the dimension that is in the one or more indices corresponding to the value;
    for each obtained new gradient, processing the new gradient to generate a respective processed gradient;
    determining a new value that is a sum or a weighted sum of the processed gradients; and
    determining a moving average between (i) the value and (ii) the new value.

17. The system of claim 16, wherein processing the new gradient comprises squaring the new gradient.

18. The system of claim 14, further comprising:
  for each dimension of the plurality of dimensions, maintaining a plurality of different sets of values that each correspond to a respective different time scale for the measures of central tendency of the past gradients.

19. The system of claim 18, wherein at least one time scale is machine-learned.

20. A non-transitory computer storage medium encoded with a computer program, the computer program comprising instructions that when executed by one or more computers cause the one or more computers to perform operations of training a neural network configured to perform a machine learning task by processing a network input to generate a network output,
  wherein the neural network comprises a neural network layer that is configured to process a layer input in accordance with at least a parameter tensor to generate a layer output, the parameter tensor comprising a plurality of network parameters and having a plurality of dimensions each having a respective plurality of indices,

28 the operations comprising:
for each dimension of the plurality of dimensions:
  maintaining a set of historical gradient values, each historical gradient value corresponding to a respective different set of one or more indices of the plurality of indices of the dimension, wherein the historical gradient value corresponding to each set of one or more indices represents a measure of central tendency of past gradients of the network parameters of the parameter tensor having an index in the dimension that is in the one or more indices; and
repeatedly performing the following:
  performing, using a plurality of training examples, a training step to obtain respective new gradients of a loss function for the machine learning task with respect to each of the plurality of network parameters of the parameter tensor;
  updating, for each set of one or more indices of each dimension of the plurality of dimensions, the corresponding set of historical gradient values for the set of one or more indices using the new gradients of network parameters having an index along the dimension that is in the set of one or more indices; and
  for each network parameter of the plurality of network parameters of the parameter tensor:
    generating an optimizer network input from at least the updated sets of historical gradient values of the plurality of dimensions, comprising:
      for each dimension of the plurality of dimensions, identifying a respective particular value, from the updated set of historical gradient values corresponding to the dimension, that corresponds to the index of the network parameter in the dimension; and
      generating the optimizer network input from at least the respective particular values for the plurality of dimensions;
    processing the optimizer network input using an optimizer neural network to generate an optimizer network output defining an update for the network parameter; and
    applying the update to a current value of the network parameter to generate an updated value for the network parameter.

* * * * *